United States Patent [19]

Carroll

[11] Patent Number: 4,683,061
[45] Date of Patent: Jul. 28, 1987

[54] OUTLET FOR CYCLONE SEPARATORS

[76] Inventor: Noel Carroll, Sherbrooke Road, Sherbrooke 3789, Victoria, Australia

[21] Appl. No.: 943,628

[22] Filed: Dec. 17, 1986

Related U.S. Application Data

[63] Continuation of Ser. No. 750,605, filed as PCT AU84/00164, Aug. 29, 1984, published as WO85/00990, on Mar. 14, 1985, abandoned.

[51] Int. Cl.⁴ ............................................. B04C 5/081
[52] U.S. Cl. ................................ 210/512.1; 209/144; 209/211
[58] Field of Search .................... 210/788, 512.1, 708, 210/304; 209/211, 144

[56] References Cited

U.S. PATENT DOCUMENTS 4,237,006 12/1980 Colman et al. .................. 210/512.1

Primary Examiner—Frank Sever

[57] ABSTRACT

A cyclone separator (10) having an axially extending separating chamber (25) with successively adjacently positioned portions (12, 14, 16) of progressively decreasing diameters and feed pipes (26, 28) for tangential inlet of liquid mixture to be separated to the separating chamber at its larger diameter end. The separating chamber (25) has an overflow outlet pipe (34) at its larger diameter end and an underflow outlet (23) at its smaller diameter end. The overflow outlet has a diameter $d_o$, adjacent the separating chamber, in the range $0.0035 \leq d_o/d_1 < 1$ where $d_1$ is the diameter of the largest diameter portion of the separating chamber. The liquid to be separated is admixed, in one embodiment of the invention, with an emulsion breaker to facilitate separation of liquid components of mixture being separated.

9 Claims, 3 Drawing Figures

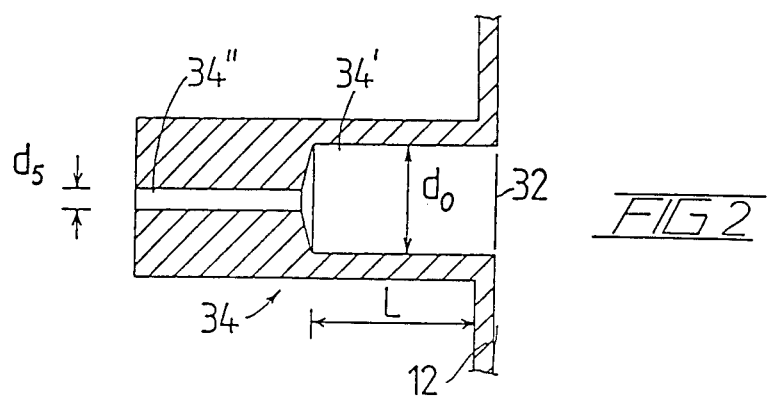
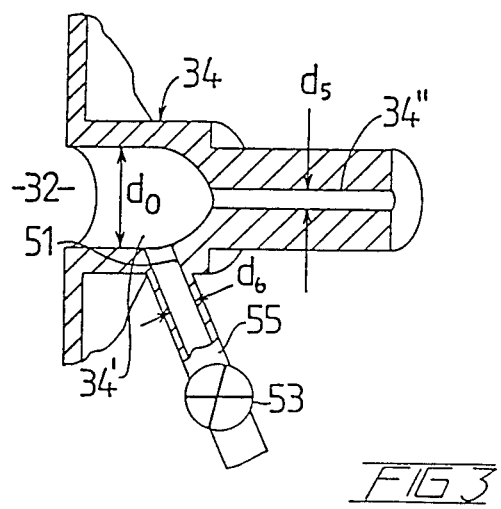

OUTLET FOR CYCLONE SEPARATORS

This is a continuation of co-pending application Ser. No. 750,605 filed Apr. 30, 1985, now abandoned.

This invention relates to a cyclone separator.

U.S. Pat. No. 4,237,006 (Coleman et al) describes a cyclone separator having a separating chamber having first, second and third contiguous cylindrical portions arranged in that order, the first cylindrical portion being of greater diameter than the second cylindrical portion and the third cylindrical portion being of lesser diameter than the second cylindrical portion, the first cylindrical portion having an overflow outlet at the end thereof opposite to said second cylindrical portion and a tangentially directed feed inlet, the separator being adapted to separate liquids one from the other in a mixture when infed into said separating chamber via said feed inlet, one said liquid emerging from said overflow outlet and the other passing through said third cylindrical portion in the direction away from said second cylindrical portion to emerge from an underflow outlet of the separator at the end of said separating chamber remote from said first cylindrical portion.

The above separator is intended specifically, but not exclusively, for separating oil from water, the oil in use emerging from the overflow outlet and the water from said third cylindrical portion.

The aforementioned cylindrical portions may not be truly cylindrical, in the sense that they do not need in all cases to present a side surface which is linear in cross-section and parallel to the axis thereof. For example, U.S. Pat. No. 4,237,006 describes arrangements wherein the first cylindrical portion has a frustoconical section adjacent the second cylindrical portion and which provides a taper between the largest diameter of the first cylindrical portion and the diameter of the second cylindrical portion where this meets the first cylindrical portion. Likewise, the aforementioned patent specification describes arrangements wherein a similar section of frustoconical form is provided to cause a tapering in the diameter of the second cylindrical portion from a largest diameter of the second cylindrical portion to the diameter of the third cylindrical portion. There is also described an arrangement wherein the second cylindrical portion exhibits a constant taper over its whole length.

In the specification of my Australia patent application No. 12421/83 various modifications of cyclone separators of the above kind are described, and these modifications may be incorporated into separators formed in accordance with this invention.

In U.S. Pat. No. 4,237,006, the described cyclone separator is said to comply with a number of dimensional restrictions insofar as the relative proportions of various components thereof are concerned. These constraints are:

$10 \leq l_2/d_2 \leq 25$ $0.04 \leq 4A_i/\pi d_1^2 \leq 0.10$ $0.1 \leq d_0/d_2 \leq 0.25$ $d_1 > d_2$ $d_2 > d_3$ wherein $d_0$ is the internal diameter of said overflow outlet, $d_1$ is the diameter of the first portion, $d_2$ is the diameter of the second portion and $d_3$ is the diameter of the third portion, $l_2$ is the length of the second portion, $A_i$ is the total cross-sectional area of all the feed inlets measured at the points of entry into the separating chamber normal to the inlet flow.

It has been found that, generally speaking, the dimensional constrains therein mentioned are applicable with advantage to cyclone separators constructed in accordance with this invention except that it has not been found necessary to comply with the constraint concerning the ratio of the overflow outlet diameter to the diameter of the second cylindrical portion. Neither has it been found necessary to adhere to the maximum limit of 25 for the ratio $l_2/d_2$, since greater values of this ratio may be employed.

Again, in the arrangement of U.S. Pat. No. 4,237,006, there are two feed inlets but it has not been found necessary to adhere to this. Arrangements with one inlet or with more than two inlets are workable.

It has been found in accordance with this invention to facilitate operation if the overflow outlet has a diameter $d_0$, adjacent the separating chamber, in the range $0.0035 \leq d_0/d_1 < 1$. More particularly, the overflow outlet may present a stepped bore with a first bore portion adjacent the first cylindrical portion being of greater diameter than a second bore portion thereof further from the first cylindrical portion. In this case the first bore portion may have a diameter $d_0$ in the range $0.0035 < d_0/d_1 \leq 1$ and the second bore portion may have a diameter $d_5$ in the range $0.0035 \leq d_5/d_1 < d_0/d_1$.

The invention provides an improved cyclone separator of the first above described kind wherein said overflow outlet presents the above mentioned stepped bore and wherein the stepped bore is characterised by the provision of a passageway leading from the said first bore portion to the exterior of the separator. The bore portions are conveniently of circular cross section but may have any convenient cross section. Preferably, valve means is provided selectively operable to permit flow from said passageway. Means may be provided sensitive to flow through the separator to control said valve means to permit said flow from said passageway on occurrence of flow through said second bore portion falling below a pre-selected rate. The flow may be measured by means positioned to be sensitive to flow in or from the second bore portion or by means positioned to be sensitive to flow in or through the first bore portion. The valve means may also be controlled to be operated by means responsive to the ratio of quantities of the liquid components in the liquid mixture to be separated whereby to open said valve means and permit flow from said passageway under the condition where the ratio exceeds a predetermined magnitude. In particular, when separating oil and water, the said valve may be opened under the condition where the oil content in emitted oil-water mixture exceeds, say, one-half percent.

Preferably too, means is provided operable to connect said passageway for flow of liquid thereinto and back into the separating chamber via said first bore portion, to facilitate clearing of blockages in the overflow outlet.

The invention is further described by way of example only with reference to the accompanying drawings in which:

FIG. 2 is an enlarged axial cross-sectional view of the overflow outlet of the separator of FIG. 1; and FIG. 3 is an enlarged fragmentary cross-sectional view of the overflow outlet of the separator of FIG. 1.

Figure 1:
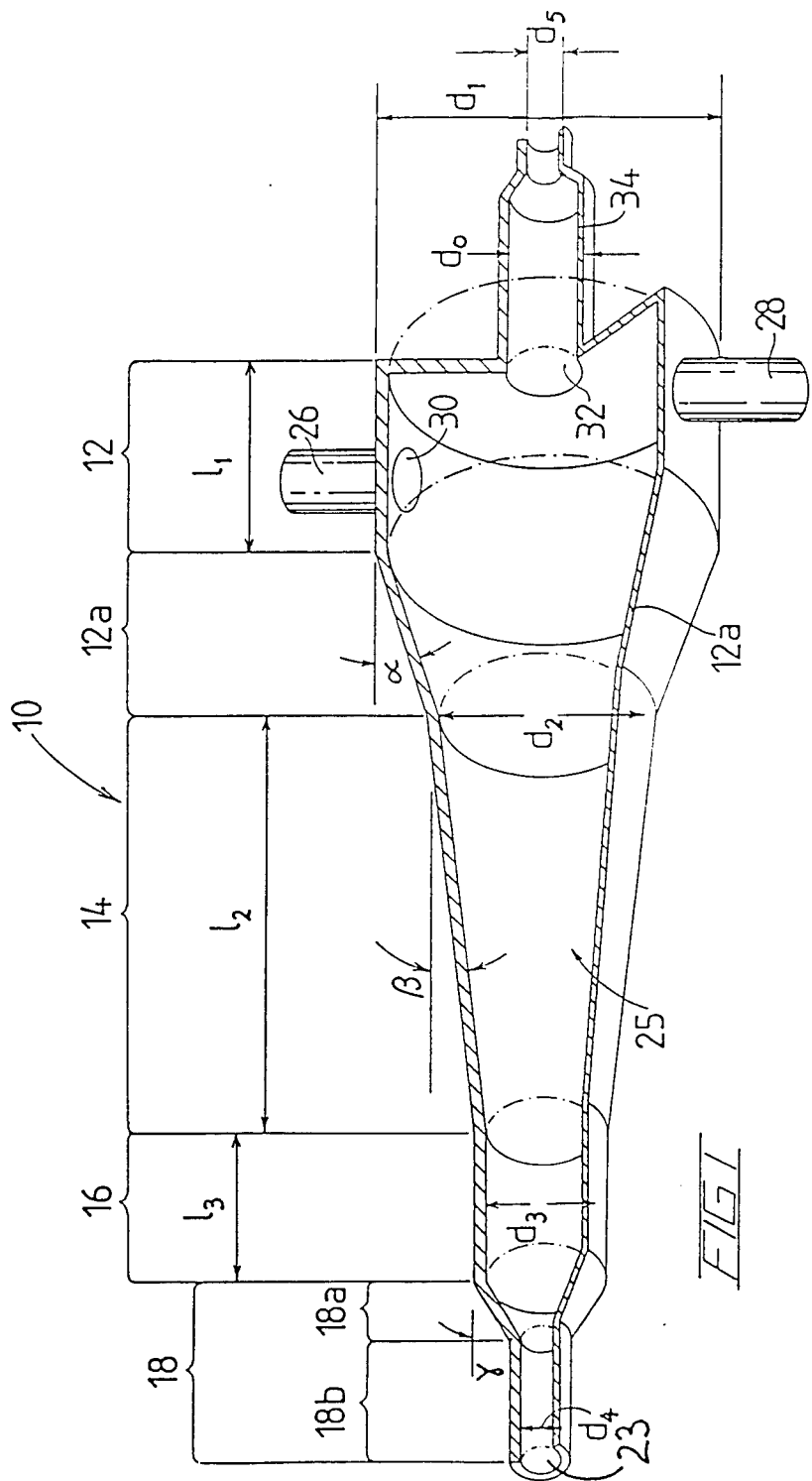
FIG. 1 is a cutaway perspective view of a cyclone separator constructed in accordance with the present invention.

The separator 10 shown in FIG. 1 has a separating chamber 25 having first, second and third cylindrical portions 12, 14 and 16 coaxially arranged in that order. These cylindrical portions are generally similar to the corresponding first, second and third cylindrical portions of the separating chamber of the cyclone separator described in the aforementioned U.S. Pat. No. 4,237,006, the disclosures of which are hereby incorporated into the present specification to form part thereof. Most particularly, the first cylindrical portion 12 has two feed pipes 26, 28 associated therewith, these being arranged to feed tangentially into the cylindrical portion 12 via respective inlet apertures of which only one aperture, namely aperture 30 associated with pipe 26, is visible in the drawing. The two feed inlet apertures are diametrically arranged one relative to the other and positioned close to the end of portion 12 remote from portion 14. The end of portion 12 remote from portion 14 also has a circular outlet opening 32 which leads to an overflow outlet pipe 34.

A tapered part 12a of the separating chamber is positioned between the first and second portions 12, 14 towards the second cylindrical portion 14. As explained in U.S. Pat. No. 4,237,006 however, such tapered section is not essential.

The second cylindrical portion 14 exhibits a taper over its length, tapering from a diameter at the end adjacent part 12a equal to the diameter of part 12a at the junction between the two portions to a somewhat lesser dimension at its opposite end. Cylindrical portion 16 is a constant diameter equal to the minimum diameter of portion 14.

In the drawing, the length $l_1$ of portion 12, its diameter $d_1$, the taper angle "$\alpha$" of the tapered part 12a, the internal diameter $d_0$ of the outlet pipe 34 at its greatest diameter end, the length and diameter $l_1$, $d_2$ of the second portion 14, the taper angle "$\beta$" of the second portion 14 and the length $l_3$ and diameter $d_3$ of the third cylindrical portion, as well as the total area $A_i$ of the two feed inlet apertures 30 may all be selected in accordance with the parameters mentioned in U.S. Pat. No. 4,237,006 although the outlet diameter $d_0$ need not constrained to be within limits as described therein, nor need the length $l_2$ be selected to not exceed the maximum limit of 25 for the ratio $l_2/d_2$.

As described in my Australian Application No. 12421/83, a portion may be added to the separating chamber 25, this portion being designated by reference numeral 18 in the figure. Portion 18 has a part 18a adjacent portion 16 which is of frustoconical configuration, tapering from a maximum diameter equal to $d_3$ at its end closest to and adjoining to the outlet end of cylindrical portion 16, to a diameter $d_4$ at its outlet end. At the outlet end of part 18a, fourth portion 18 includes an outlet pipe 18b which is of internal diameter $d_4$, this leading to an underflow outlet 23.

Preferably, the angle "$\gamma$", being the conicity or half-angle of the frustoconical surface of part 18a is about 45°, although angles in the range 30° to 60° are generally satisfactory. In any event, it is preferred that the ratio $d_4/d_3$ be in the range 1:3 to 2:3. The length of part 18a is not critical to the invention and in any event is normally fixed by the selection of the aforementioned ratio of diameters $d_4$ to $d_3$. Likewise, the length of the pipe 18b has not been found to be important to the operation of the invention.

Although part 18a is shown as having a truly frustoconical cross-sectional form (that is to say it is shown as having a side surface which exhibits a linear sloping configuration relative to the axis of the portion when viewed in section) this is not essential. The part 18 may have a conicity angle which varies along the length thereof such as either increasing or decreasing the direction from the greater diameter end to the lesser diameter end thereof. In any event, it is preferred that the length of the part 18 be roughly the same as the maximum diameter thereof.

In use, liquid to be separated is admitted tangentially to the interior of cylindrical portion 12 via feed pipes 26, 28, the denser component of the liquid then travelling lengthwise through the separator to emerge from outlet 23 of pipe 18b, whilst the lighter component emerges from pipe 34.

In practical arrangements constructed in accordance with the invention, the portions 12, 14, and 16 may for example be of lengths $l_1 = 116$ mm, $l_2 = 1250$ mm, and $l_3 =$ approximately 1000 mm. The tapered part 12a may be of length about 160 mm. The first, second and third cylindrical portions may also in such a case have diameters as follows: first cylindrical portion, diameter $d_1$, 116 mm, second cylindrical portion 14; diameter 58 mm at diameter $d_2$ tapering to 27 mm at diameter $d_3$, cylindrical portion 16, diameter $d_3$, 27 mm. The feed inlets 30 may have diameters of 20 mm with the overflow outlet 32 being of diameter 2.5 mm.

FIG. 2 shows outlet pipe 34 in more detail. The pipe has a stepped interior bore leading from outlet opening 32. More particularly, the bore has a first portion 34' adjacent outlet 32 of diameter equal to the diameter of outlet 32 and a second portion 34" away from outlet 32 of lesser diameter than bore portion 34'. Bore portion 34' may be of diameter $d_0$ in the range 0.125 to 0.625 preferably 0.17 to 0.47 times the diameter $d_1$ of portion 12 of the separating chamber 25. Bore portion 34" may be of diameter $d_5$ 0.015 to 0.05 preferably 0.025 to 0.035 times the diameter $d_1$ of portion 12 of the separating chamber 25. However, in principle, the first bore portion may have a diameter $d_0$ anywhere in the range of $0.0035 < d_0 d_1 \leq 1$ and the second bore portion may have a diameter $d_5$ in the range $0.0035 \leq d_5/d_1 < d_0/d_1$.

The length of the bore portion 34" is not important. It has been determined that the efficiency tends to decrease slightly as the length L, of the bore portion 34' is increased. With increasing length L, a point is eventually reached where the operation of the cyclone becomes unstable. It has also been found that the smaller the diameter $d_0$, the larger can be the length L before unstable operation occurs. Generally the ratio $L/d_0$ may be up to 10 at least for ratios $d_0/d_2 \geq 0.31$.

EXAMPLE

Tests were conducted on a separator having diameters $d_2$, $d_0$, $d_5$ as follows:

$d_1 = 116$ mm
$d_2 = 58$ mm
$d_0 = 18$ mm
$d_5 = 3.2$ mm was operated to separate oil from a mixture with water. The length L of outlet pipe at its larger diameter portion was varied and the separating efficiency E measured for each variation. Separate tests were undertaken when the separator was operated with a split ratio F equal to 1.5% and equal to 1.0%. The split ratio F, is defined as the ratio $$F = \frac{\text{Volume of removed oil from outlet pipe 34}}{\text{Volume of mixture supplied to the separator per unit time}}$$

The efficiency was determined by measuring the concentration $C_1$ of oil in the inlet mixture and the concentration of oil $C_2$ in the water delivered from the underflow outlet of the separator so that efficiency E is defined as the ratio $$\frac{C_1 - C_2}{C_1}$$

These tests undertaken at volumetric flow of 200 L/minute gave results as shown in tables 1 and 2, where M is the ratio $L/d_0$.

TABLE 1

| | F = 1.5% | | |
|---|---|---|---|
| M | $C_1$ ppm | $C_2$ ppm | E |
| 3.5 | 200 | 16 | 92% |
| 3.5 | 400 | 22 | 94% |
| 9.6 | 350 | 17 | 95% |
| 9.6 | 500 | 30 | 94% |
| 10.8 | 200 | 22 | 89% |

TABLE 2

| | F = 1% | | |
|---|---|---|---|
| M | $C_1$ ppm | $C_2$ ppm | E |
| 3.5 | 200 | 18 | 91% |
| 3.5 | 400 | 24 | 94% |
| 9.6 | 400 | 44 | 89% |

In the embodiment shown in FIG. 3, outlet pipe 34 also has a passageway 51 formed through the side wall thereof and providing communication between the bore portion 34' and the exterior of the outlet pipe 34. This passageway may for example have a diameter in the range 0.05 to 0.10 of the diameter $d_1$. Passageway 51 provides communication, via an exterior pipe 55 to a valve 53. Under normal operating conditions, valve 53 may be closed so that overflow passes from the outlet 32 through the bore portion 34' and thence through the bore portion 34". However, under the condition where blockage of the pipe 34 occures liquid may be admitted into the bore portion 34' via the pipe 55 and passageway 51 by connecting the outlet of the valve 53 to suitable high pressure liquid supply to permit liquid flow back through the passageway 34' through the outlet 32 and into the separating chamber of the separator. This has been found to facilitate clearing of blockages, even where the blockage occurs in the bore portion 34". The supply of high pressure liquid may be the supply of liquid to be separated which may, for example, be temporarily diverted from inflow into the inlet pipes 26, 28 during the time of admission of the liquid through the passageway 51 into the outlet pipe 34. It is possible, in an alternative embodiment of the invention (not shown), to provide flow sensing means operable to sense the flow from the outlet pipe 34 and to automatically operate the valve 53 to divert the incoming liquid flow which is normally passed to the inlet pipes 26, 28 to flow through passageway 51 to the bore portion 34' for blockage clearing.

It has been found that whilst, in general, the provision of the narrow bore portion 34" provides very satisfactory separation, it is necessary or desirable under some conditions to have a wider outlet from the separator than is provided by the bore portion 34". Under this condition, then, it is possible to open the valve 53 whereby outflow of the desired separated component through the pipe 34 occurs through the passageway 51, pipe 55 and valve 53. Such an arrangement is desirable, when separating oil and water from an oil-water mixture where the quantity of oil in the mixture to be separated is relatively great. In particular, it is possible to provide means for continuously monitoring the oil content of water being admitted to the inlet pipes 26, 28 and connected to operate the valve 53 so as to permit outflow from the passageway 51 and pipe 55 and valve 53 under the circumstance where detected oil content exceeds a predetermined value, such as one-half percent.

An experimental separator constructed in accordance with this invention was found to perform satisfactorily for separating oil and water where the separator had the following dimensions:

diameter $d_0$ of the outlet bore portion $34' = 19$ mm
diameter $d_5$ of the outlet bore portion $34'' = 3$ mm
diameter $d_6$ of the passageway $51 = 9$ mm
diameter $d_1 = 116$ mm The invention is not confined to arrangements where there is a single passageway 51. For example two or more such passageways of various diameters may be provided. These may be selectively operable in accordance with the measured oil content or, for example, one may be used for diverting outflow under the high oil content condition and another used for clearance of blockages.

Operation of the separator of the invention, particularly oil and water, may be facilitated by arranging for entrainment of a suitable emulsion breaker into the incoming water-oil mixture.

The entrainment may be effected by use of known dosing techniques such as injecting an emulsion breaker into the incoming liquid prior to feeding to the feed pipes 26, 28.

Commercially available emulsion breakers have been found quite satisfactory. The emulsion breaker "Nalco 7723" marketed by Catoleum Pty Ltd Botany N.S.W. Australia was found effective when injected in concentrations in the range 5 to 8 p.p.m.

Emulsion breakers, or surfactants, are thought to be effective in facilitating separation of oily water because the oil is naturally present in the form of droplets which, by surface tension effects, are resistant to separating movement under centrifugal action in the separator. However, emulsion breakers act to reduce such surface tension effects to render the droplets more mobile under centrifugal forces.

Depending on the particular breaker used the concentration of added emulsion breaker may be selected to be in the range 2 to 100 p.p.m. Generally, the effectiveness of the emulsion breaker is dependent on the extent of kinetic mixing which occurs and the residence time in the mixture prior to admission to the separator. Good mixing and adequate residence time are necessary for best results. Generally, however, the described method of injection into the incoming liquid has been found satisfactory.

If greater residence time is found necessary this may be accomplished by passing the mixture and added emulsion breaker to a holding tank prior to passing to the separator.

EXAMPLE 1

Water containing 350 p.p.m. oil was admitted to a cyclone separator of form similar to that shown in FIG. 1, and of diameter $d_2 = 35$ mm, at a flow rate of 200 liter/minute. The exit concentration of oil in separated water, at the underflow outlet, was found to be 50 p.p.m.

EXAMPLE 2

Example 1 was repeated but with the injection into the oil-water mixture prior to admission to the separator of 30 p.p.m. of a commercial emulsion breaker type sold under the name Applied Chemicals type 8980. Injection was made into a pipe leading to the separator inlet by use of a piston pump from a reservoir of the emulsion breaker. The separated water at the underflow outlet of the separator was found to have a concentration of 14 p.p.m. oil.

These and many modifications may be made without departing from the spirit and scope of the invention as defined in the appended claims.

I claim:

1. A cyclone separator comprising elements designed, sized and arranged for treating a mixture for separating a more dense liquid component from a less dense liquid component thereof, said separator having a separating chamber with first, second and third contiguous cylindrical portions arranged in that order, the first cylindrical portion being of greater diameter than the second cylindrical portion and the third cylindrical portion being of lesser diameter than the second cylindrical portion, the second cylindrical portion being of a length which is at least ten times its diameter adjacent the first cylindrical portion, the first cylindrical portion having an overflow outlet at the end thereof opposite to said second cylindrical portion and at least one tangentially directed feed inlet and an underflow outlet at the end of said separating chamber remote from said first cylindrical portion; wherein said overflow outlet has a diameter $d_0$, adjacent the separating chamber, in the range $0.0035 < d_0/d_1 < 1$ where $d_1$ is the diameter of the first cylindrical portion, said overflow outlet presenting a stepped bore with a first bore portion adjacent the first cylindrical portion being of greater diameter than a second bore portion thereof further form the first cylindrical portion wherein said stepped bore is characterised by the provision of a passageway extending sideways from the said first bore portion to the exterior of the separator, and including valve means selectively operable to permit flow from said passageway, said passageway facilitating clearing of blockages in the overflow outlet by supply of high pressure fluid therethrough.

2. A cyclone separator as claimed in claim 1, wherein the length L of said first bore portion is in the range $0 < L/d_0 < 10$.

3. A cyclone separator as claimed in 2 wherein the diameter $d_0$ is not substantially more than 0.31 of the diameter $d_2$ of the second cylindrical portion.

4. A cyclone separator as claimed in claim 1 where $0.04 \leq 4A_i/\pi d_1^2 \leq 0.10$ where $A_i$ is the total area of all the feed inlets to the separating chamber.

5. A cyclone separator as claimed in claim 1 wherein the length $l_2$ of the second cylindrical portion is at least ten times the diameter $d_2$ of the second cylindrical portion.

6. A cyclone separator as claimed in claim 1 wherein means is provided sensitive to flow through the separator to control said valve means to permit said flow from said passageway on occurrence of flow through said second bore portion falling below a pre-selected rate.

7. A cyclone separator as claimed in claim 6 wherein said means is positioned to be sensitive to flow in or from the second bore portion or is positioned to be sensitive to flow in or through the first bore portion.

8. A cyclone separator as claimed in claim 1 wherein the valve means is controlled to be operated by means responsive to the ratio of quantitites of the liquid components in the liquid mixture to be separated whereby to open said valve means and permit flow from said passageway under the condition where the ratio exceeds a predetermined magnitude.

9. A cyclone separator as claimed in claim 1 wherein means is provided operable to connect said passageway for flow of liquid thereinto and back into the separating chamber via said first bore portion, to facilitate clearing of blockages in the overflow outlet.

* * * * *